United States Patent [19]

Francisco, Jr.

[11] E Re. 31,432

[45] Reissued Nov. 1, 1983

[54] APPARATUS AND METHOD FOR DETERMINING THE CHARACTERISTIC OF A FLOWMETER

[75] Inventor: Edward E. Francisco, Jr., Paradise Valley, Ariz.

[73] Assignee: Flow Technology, Inc., Phoenix, Ariz.

[21] Appl. No.: 316,992

[22] Filed: Nov. 2, 1981

Related U.S. Patent Documents

Reissue of:

[64] Patent No.: 4,152,922
Issued: May 8, 1979
Appl. No.: 907,681
Filed: May 19, 1978

U.S. Applications:

[63] Continuation of Ser. No. 177,448, Aug. 11, 1980, abandoned.

[51] Int. Cl.[3] ..... G01F 25/00
[52] U.S. Cl. ..... 73/3; 73/47
[58] Field of Search ..... 73/3, 232, 259

[56] References Cited

U.S. PATENT DOCUMENTS

| | | | |
|---|---|---|---|
| 2,892,346 | 6/1959 | Sargent | 73/194 |
| 3,098,382 | 7/1963 | Hoffman et al. | 73/3 X |
| 3,125,879 | 3/1964 | Porter | 73/3 |
| 3,273,375 | 9/1966 | Howe | 73/3 |
| 3,463,004 | 8/1969 | Withnell | 73/232 |
| 3,492,856 | 2/1970 | Francisco et al. | 73/3 |
| 3,673,851 | 7/1972 | Wright et al. | 73/3 |
| 3,877,287 | 4/1975 | Duntz | 73/3 |

FOREIGN PATENT DOCUMENTS

| | | | |
|---|---|---|---|
| 426152 | 2/1971 | U.S.S.R. | 73/3 |

OTHER PUBLICATIONS

Finkelstein, Theodor, "Regenerative Thermal Machines," *International Science and Technology*, May 1962, pp. 54–59.

*Primary Examiner*—S. Clement Swisher
*Attorney, Agent, or Firm*—Christie, Parker & Hale

[57] ABSTRACT

A measuring cylinder has at its ends an inlet and an outlet connected in a fluid system in series with a flowmeter. A measuring piston is adapted to travel through the measuring cylinder as a fluid barrier. A poppet valve on the inlet side of the measuring piston is adapted to seal a passage through the measuring piston when closed so the measuring piston travels through the measuring cylinder as a fluid barrier, and to permit fluid flow through the passage when open. A retracting piston is adapted to travel through a retracting cylinder having a smaller cross-sectional area than the measuring cylinder as a fluid barrier. A rod is connected between the retracting cylinder and the poppet valve to open and close the poppet valve as the retracting piston moves relative to the measuring piston. The movement of the retracting piston through the retracting cylinder is controlled so as to hold the measuring piston at an upstream position of the measuring cylinder prior to a test run, to release the measuring piston when a test run is initiated, and to return the measuring cylinder to the upstream position after the test run. In one embodiment, the movement of the retracting cylinder is controlled during the test run to maintain a constant difference in pressure between the upstream and downstream sides of the measuring piston.

51 Claims, 6 Drawing Figures

APPARATUS AND METHOD FOR DETERMINING THE CHARACTERISTIC OF A FLOWMETER

Matter enclosed in heavy brackets [ ] appears in the original patent but forms no part of this reissue specification; matter printed in italics indicates the additions made by reissue.

*CROSS REFERENCE TO RELATED APPLICATIONS*

*This is a continuation of application Ser. No. 177,448, filed Aug. 11, 1980 now abandoned.*

BACKGROUND OF THE INVENTION

This invention relates to the measurement of fluid flow and, more particularly, to a method and apparatus for determining the characteristic of a flowmeter.

In order to obtain accurate readings from a flowmeter, it must be calibrated from time to time by determining its characteristic, i.e., the constant of proportionality between the flow rate of the fluid flowing through the flowmeter and the response given by the flowmeter. In the case of a turbine type flowmeter that develops electrical oscillations proportional in number to the volume of flow through the flowmeter, this characteristic would be expressed in terms of the number of pulses generated by the flowmeter per unit volume of fluid passing through the flowmeter. The flowmeter characteristic is a function of the type of fluid, as well as the fluid temperature, pressure, and flow rate, and varies as the parts of the flowmeter wear in the course of use. Apparatus to determine the characteristic of a flowmeter while in an operating fluid system is called a prover. Apparatus to determine the characteristic of a flowmeter in a special test set up, i.e., not in an operating fluid system, is called a calibrator.

A known technique for determining the characteristic of a flowmeter is to compare its response with a so-called ballistic flow calibrator or prover connected in series with the flowmeter. The ballistic flow apparatus employs a piston that travels in a cylinder in synchronism with the fluid traveling through the flowmeter. By measuring the time interval required for the piston to travel a given distance through the cylinder, an average flow rate can be calculated, which is used to determine the flowmeter characteristic. U.S. Pat. No. 3,492,856, which is assigned to the assignee of the present application, discloses improved ballistic flow apparatus in which the piston has a passage through it and a plug, i.e., a valve, that seals the passage when closed and permits fluid flow through the passage from one side of the piston to the other when open. The end of a cable wrapped around a drum is attached to the valve for the purpose of holding the piston in an upstream position prior to a test run, releasing the piston when a test run is initiated, and returning the piston to the upstream position after the test run.

SUMMARY OF THE INVENTION

According to the invention, an auxiliary piston is disposed within an auxiliary cylinder where it is adapted to move as a fluid barrier. The auxiliary piston is interconnected to a fluid displacement measuring piston adapted to move through a fluid displacement measuring cylinder as a fluid barrier the same distance as the auxiliary piston moves through the auxiliary cylinder. The measuring cylinder is connected in series with a flowmeter whose characteristic is to be determined. The movement of the auxiliary piston is fluidically controlled to control the measuring piston.

In one embodiment of the invention, the measuring piston has a passage through it and a valve that seals the passage when closed so the measuring piston travels through the measuring cylinder as a fluid barrier, and permits fluid flow through the passage when open. The auxiliary piston is controlled so as to hold the measuring piston at an upstream position with the valve open prior to a test run, to release the measuring piston by closing the valve and carry out a test run, and to return the measuring piston to the upstream position with the valve open after the test run.

In another embodiment of the invention, the movement of the auxiliary piston during the test run is controlled to maintain the difference in pressure between the upstream side and the downstream side of the measuring piston constant, which suppresses perturbations in the fluid system, particularly in the case of a gas system.

In summary, the invention permits effective control to be exercised over the measuring piston at various times and in various ways during the cycle of operation in which a flowmeter characteristic is determined.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

The disclosures of Francisco U.S. Pat. No. 3,403,544, which issued Oct. 1, 1968, and Francisco U.S. Pat. No. 3,492,856 which issued Feb. 3, 1970, are incorporated fully herein by reference.

Figure 1:
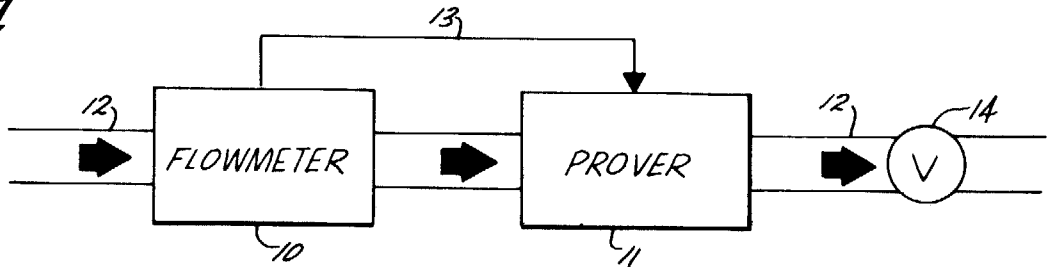
FIG. 1 is a block diagram of a prover and a flowmeter connected in series in a fluid system.

In FIG. 1, a flowmeter 10 and a prover 11 are connected in series in a fluid line 12 of a fluid system which has a shut off valve 14 downstream of prover 11. Fluid flow through the system is represented by solid arrows. The output of flowmeter 10 is coupled by an electrical connection 13 to prover 11.

Figure 2:
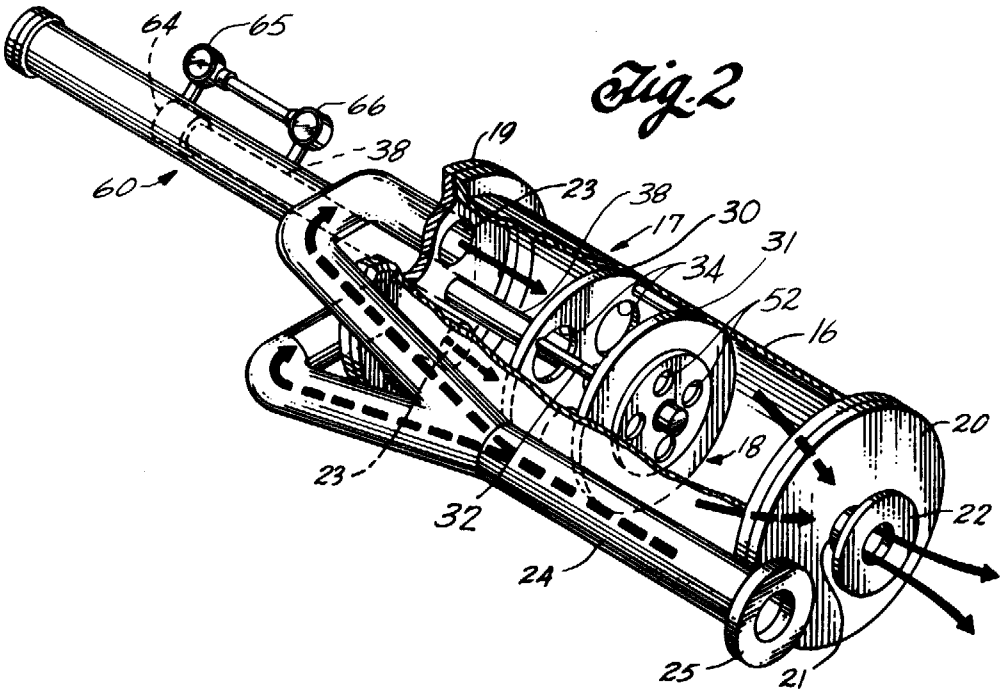
FIG. 2 is a perspective view of a prover incorporating the principles of the invention.
Figure 3:
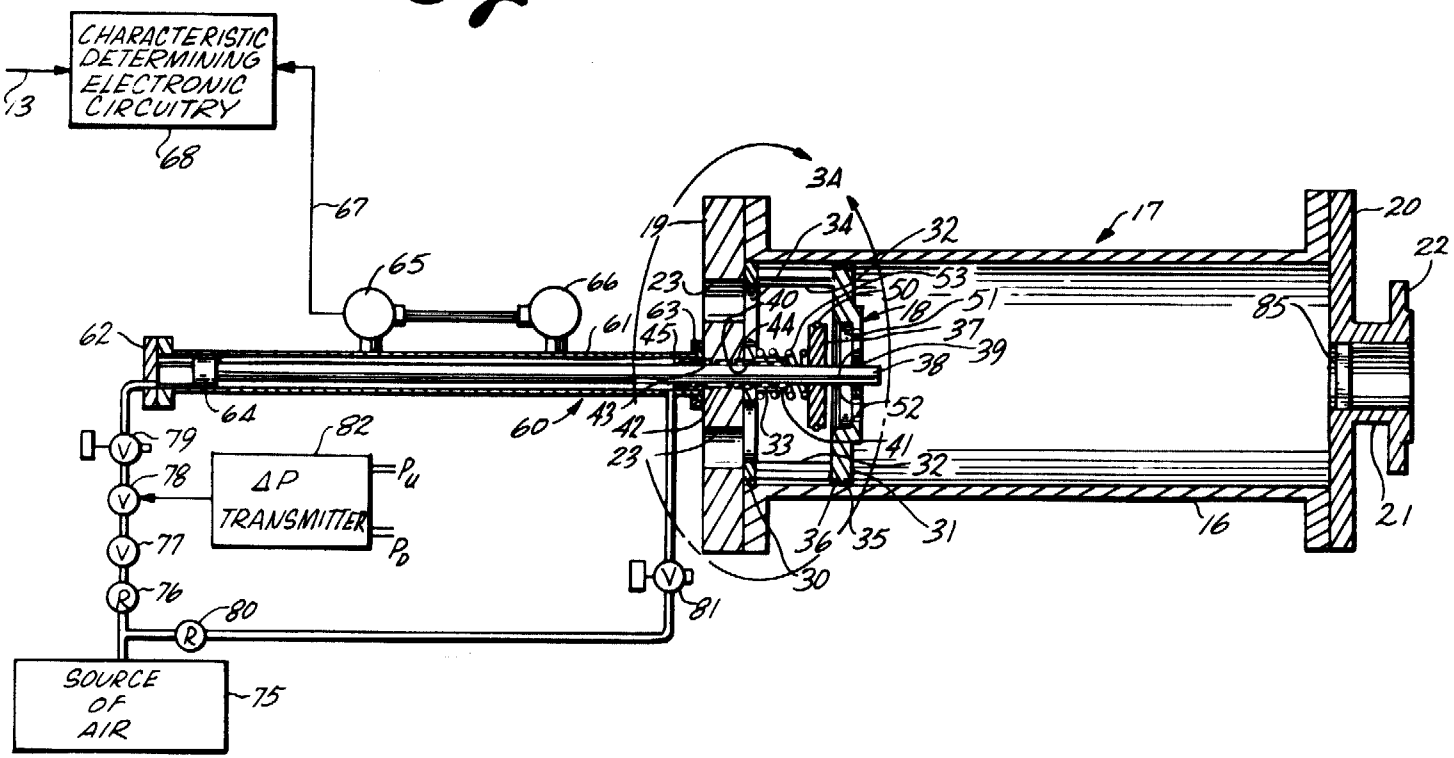
FIG. 3 is a side sectional view of the prover of FIG. 2 without the inlet conduit, including a schematic representation of the fluidic control circuitry
Figure 3A:
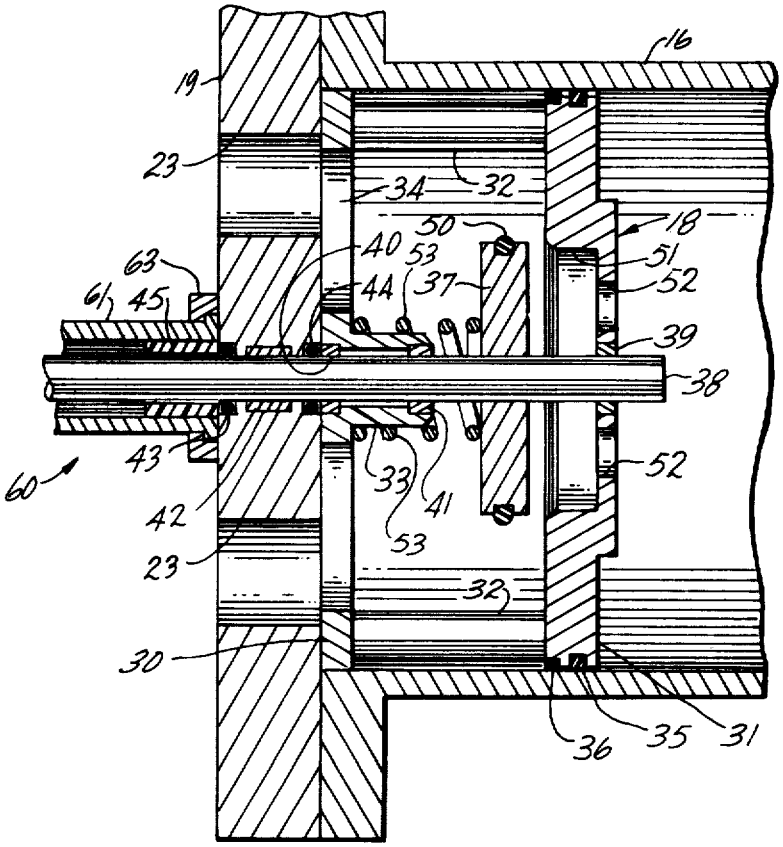
FIG. 3A is an enlargement of a portion of FIG. 3.

As shown in FIGS. 2 and 3, prover 11 comprises a fluid displacement measuring cylinder 17 in which a fluid displacement measuring piston 18 is located and adapted to move as a fluid barrier. Cylinder 17 is formed from a cylindrical conduit 16 that is flanged at both ends, an end plate 19 secured to the upstream flange of conduit 16 by means not shown, and an end plate 20 secured to the downstream flange of conduit 16 by means not shown. Integral with plate 20 is a conduit 21 opening into conduit 16, which forms the outlet of cylinder 17. The end of conduit 21 has a mounting flange 22 for connection of the prover to the downstream portion of fluid line 12 (FIG. 1). A pair of passages 23 are formed in plate 19 on either side of the central axis of conduit 16. A conduit 24, which has a Y configuration opening into conduit 16 through passages 23, serves as the inlet of cylinder 17. Integral with the end of conduit 24 is a mounting flange 25 by which prover 11 is connected to the upstream portion of fluid line 12 (FIG. 1).

Piston 18 comprises a generally disc-shaped member 30, and a generally disc-shaped member 31 between which a plurality (e.g. four) of spacers 32 extend. Members 30 and 31 and spacers 32 could be integral or separate parts. In the latter case, they would be held together by fasteners passing through spacers 32. Member 30 has a centrally located integral collar 33 around which a plurality (e.g. four) of large openings 34 are distributed. An O-ring seal 35 is retained in a groove around the periphery of member 31. A lip seal 36 is disposed around the periphery of member 31 upstream of O-ring seal 35. A disc-shaped poppet valve 37 is fixedly mounted on an axially movable rod 38 between members 30 and 31. Upstream of poppet valve 37, rod 38 extends through an opening in collar 33, where it is supported for axial movement by spaced apart bushings 40 and 41, and a central opening in plate 19, where it is supported for axial movement by a bushing 42. Lips seals 43 and 44 are located in the central opening in plate 19 on either side of bushing 42. An O-ring seal 50 is retained in a groove around the periphery of poppet valve 37. Member 31 has a central recess 51 with a side wall dimensioned to receive poppet valve 37 and engage O-ring seal 50. A plurality (e.g. four) of passages 52 are formed in recess 51 around rod 38 to provide fluid communication from the upstream side of piston 18 to the downstream side thereof. When poppet valve 37 is open, it is positioned by axial movement of rod 38 to lie upstream of member 41 in spaced relationship therefrom outside recess 51, as shown in FIG. 3, thereby permitting fluid flow through passage 52. When poppet valve 37 is closed, it is positioned by axial movement of rod 38 to lie within recess 51, thereby sealing passages 52. An optional compression spring 53 is disposed around rod 38 between member 30 and poppet valve 37 to assist the closing of poppet valve 37 by urging it toward recess 51. The outer surface of collar 33 serves to align compression spring 53 with rod 38.

A retracting cylinder 60 is attached to plate 19 in axial alignment with cylinder 17. Cylinder 60 comprises a cylindrical conduit 61 having flanged ends, an end plate 62 secured to one end flange of conduit 61 by means not shown, and a bracket 63 by which the other end flange of conduit 61 is secured to plate 19 such that rod 38 extends into conduit 61. Within conduit 61, a retracting piston 64, which has a smaller cross-sectional area than piston 18, is secured to the end of rod 38. Piston 64 fits snugly within conduit 61 so as to travel therethrough as a fluid barrier. Pick-off coils 65 and 66 are mounted on the outside of conduit 61 at spaced apart points along the path of travel of piston 64. Pick-off coils 65 and 66 are coupled by electrical connections 67 to characteristic determining electronic circuitry 68 along with connection 13 from flowmeter 10 (FIG. 1). Circuitry 68 could comprise the circuitry shown in FIG. 8 of U.S. Pat. No. 3,403,544.

Piston 64 is fluidically controlled by a source of air 75 under pressure. The outlet of source 75 is connected by a regulator 76, a solenoid actuated ON/OFF valve 77, an analog control valve 78, and a solenoid actuated three-way valve 79 in series to the upstream end of cylinder 60, and is connected by a regulator 80 and a solenoid actuated three-way valve 81 in series to the downstream end of cylinder 60. Depending upon the state of the actuating solenoid, valve 77 is either open or closed. Depending upon the state of the actuating solenoid, valves 79 and 81 individually either vent the interior of cylinder 60 to the atmosphere or pressurize the interior of cylinder 60 with air from source 75. AP transmitter 82 has input ports $P_U$ and $P_D$ in fluid communication with the upstream and downstream ends, respectively, of the interior of cylinder 17. Valve 78 is controlled by an electrical signal generated by P transmitter 82, which is proportional to the difference in pressure between the fluid communicated to ports $P_U$ and $P_D$.

During normal operation of the fluid system in which the prover is connected, valve 81 is pressurizing the downstream end of the cylinder 60, valve 77 is closed, and valve 79 is venting the upstream end of cylinder 60 to the atmosphere. As a result, the air pressure from source 75 maintains piston 64 at its upstream end, which holds piston 18 in a ready condition at its upstream end with poppet valve 37 open, as shown in FIG. 3. Thus, the fluid flowing through the system passes through passages 52 of piston 18 unimpeded, as illustrated by the heavy arrows in FIG. 1. To initiate a test run that determines the characteristic of flowmeter 10, valve 77 is opened, the state of valve 79 is changed to pressurize the upstream end of cylinder 60, and the state of valve 81 is changed to vent the downstream end of cylinder 60. As a result, the difference in pressure on the upstream and downstream faces of piston 64, aided by spring 53, closes poppet valve 37 and releases piston 18. As poppet valve 37 closes, piston 18 begins to travel downstream through cylinder 17. When poppet valve 37 is fully close, piston 18 is moving completely in synchronism with the fluid flowing through cylinder 17 and flowmeter 10. Pick-off coil 65 is located at a position along cylinder 60 corresponding to a position along cylinder 17 where poppet valve 37 is fully closed and piston 18 is moving completely in synchronism with the fluid flowing through cylinder 17. A resilient stop 45 is used between piston 64 and end plate 19 to stop the movement of rod 38 at completion of test run, allowing piston 18 to continue downstream opening poppet valve 37 permitting fluid to flow thru passage 52.

As a safety measure a bar 85 is attached across the inside of conduit 16 adjacent to end plate 20 so as to stop rod 38 and open poppet valve 37 when piston 18 reaches the downstream end of cylinder 17. If desired, resilient stops for members 31 and 30 could also be provided at the downstream and upstream ends, respectively, of cylinder 17 to cushion the impact of piston 18. While piston 64 passes between pick-off coils 65 and 66, a given volume of fluid flows through cylinder 17, namely, a volume equal to the product of the internal cross-sectional area of cylinder 17 times the distance that piston 18 travels. As described in U.S. Pat. No. 3,492,856, this given volume divided by the time interval required for piston 64 to pass between pick-off coils 65 and 66 represents an average flow rate that is compared with the response of flowmeter 10 in order to determine its characteristic. At the end of the test run, piston 18 is located at its downstream position in cylinder 17 with poppet valve 37 open so that fluid flowing through the system may again pass through passages 52 of piston 18 unimpeded.

The movement of piston 18 through cylinder 17 during a test run tends to cause perturbations in the fluid system, particularly when the fluid is compressible, i.e., a gas. To suppress these perturbations, the electrical signal generated by ΔP transmitter 82, automatically controls the degree of opening of valve 78 so as to provide between the upstream and downstream faces of piston 64 a pressure differential such that the difference in pressure between the upstream side and the downstream side of piston 18 in cylinder 17 remains constant during the test run. In other words, piston 64 exerts an equalizing force on piston 18 through rod 38. Preferably, the difference in pressure between the upstream and downstream sides of piston 18 is very small, namely, of the order of several inches of water column, the higher pressure being on the downstream side of piston 18. The maintenance of a higher pressure on the downstream side of piston 18 than on the upstream side thereof ensures that poppet valve 37 is closed and sealing passages 52 during the test run, because if any fluid were to flow through passages 52 there would be a higher pressure on the upstream side thereof than the downstream side thereof. For this reason, it is desirable under some circumstances to automatically control the differential pressure across piston 64 in the described manner when the prover is connected in an incompressible, i.e., liquid, fluid system in order to ensure that poppet valve 37 is closed during the test run even though such a fluid system would not be subject to the large perturbations of a compressible fluid system.

To return piston 18 to its upstream position at the end of a test run, valve 77 is closed, the state of valve 79 is changed to vent the upstream end of cylinder 60, and the state of valve 81 is changed to pressurize the downstream end of cylinder 60. As a result, piston 64 is driven by the air pressure from source 75 to the upstream end of cylinder 60, pulling piston 18 along with it to its upstream position with poppet valve 37 open. Thus, piston 18 is ready for a new test run when it is desired to redetermine the characteristic of flow meter 10.

Figure 4:
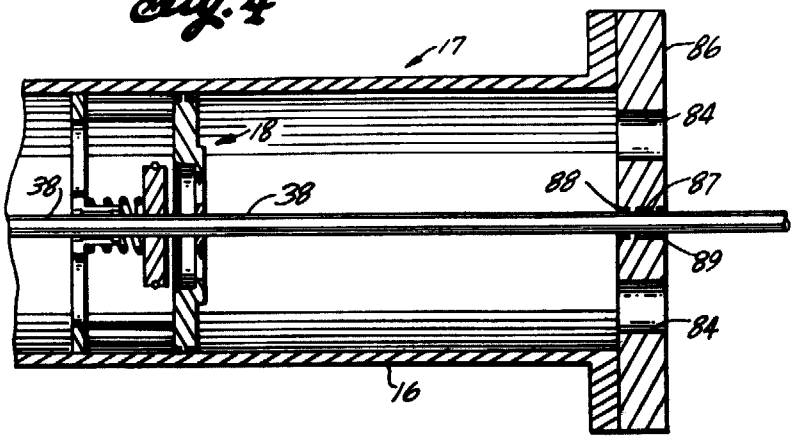
FIG. 4 is a side sectional view of a modification of the prover of FIGS. 2 and 3.

In the modification of FIG. 4, the elements in common with the embodiment of FIGS. 2 and 3 bear the same reference numerals. Rod 38 extends completely through cylinder 17 from end to end. An end plate 86 is secured to the downstream end flange of conduit 16 by means not shown. Plate 86 has a central opening through which rod 38 passes. A bushing 87 in the central opening supports rod 38 for axial movement and lip seals 88 and 89 on either side of bushing 87 prevent leakage of fluid from cylinder 17. A pair of passages 84, analagous to passages 23 (FIG. 3) serve as the outlet from cylinder 17. By having rod 38 extend through cylinder 17 from end to end, the force imbalance on piston 18 created by rod 38 in the embodiment of FIGS. 2 and 3 is eliminated. More specifically, in the embodiment of FIGS. 2 and 3, because of rod 38 there is a larger area for the fluid to act upon the downstream side of piston 18 than the upstream side thereof, which causes force imbalance.

Figure 5:
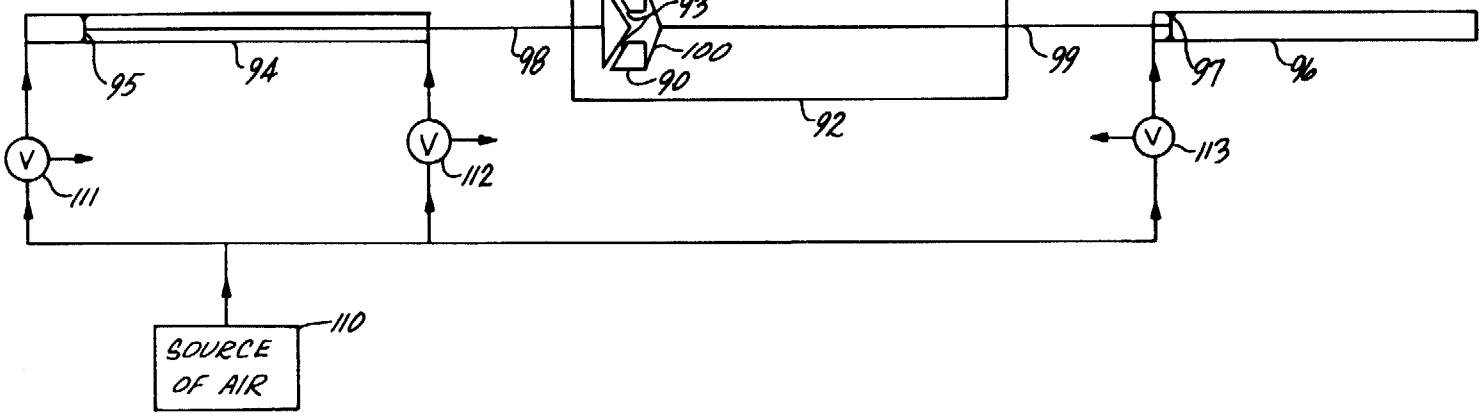
FIG. 5 is a schematic view of another embodiment of the prover of FIGS. 2 and 3.

In the embodiment of FIG. 5, a measuring piston 90 having a poppet valve 91 is adapted to travel through a measuring cylinder 92 as a fluid barrier when poppet valve 91 is closed. When poppet valve 91 is open, fluid flows through passages 93 in piston 90. A retracting cylinder 94 through which a retractng piston 95 travels as a fluid barrier is axially aligned with the upstream end of cylinder 92.

A retracting cylinder 96 through which a retracting piston 97 travels as a fluid barrier is axially aligned with the downstream end of cylinder 92. A rod 98 is connected between poppet valve 91 and piston 95. A rod 99 is connected between piston 90 and piston 97. The end of rod 99 is attached to piston 90 by a web structure 100. Piston 90, poppet valve 91, cylinder 92, and passages 93 could be constructed as illustrated in FIGS. 2, 3 and 4.

A source of air or any appropriate fluid 110 under pressure is supplied by solenoid actuated three-way valves 111, 112, and 113 to the upstream end of cylinder 94, the downstream end of cylinder 94, and the upstream end of cylinder 96, respectively. The downstream end of cylinder 96 is vented. To hold piston 90 at its upstream position, the states of valves 111 and 113 are such that they are vented, and the state of valve 112 is such that the downstream end of cylinder 94 is pressurized. To release piston 90 and begin a test run, the states of valves 111 and 112 are changed, so the upstream end of cylinder 94 is pressurized and the downstream end thereof is vented. As described to this point, cylinder 96 and piston 97 play no role in the operation of the apparatus. They, however, assist in the return of piston 90 to the upstream position. During such return, the states of valves 111 and 112 are again changed so the upstream end of cylinder 94 is vented and the downstream end thereof is pressurized, and the state of valve 113 is changed so the upstream end of piston 97 is pressurized (less than the downstream end of piston 95), which assists in the opening of poppet valve 91 during the return of piston 90.

The described prover can be conveniently tested to ensure there is no leakage in the seal between poppet valve 37 and the sides of recess 51, the seal between member 31 and the inside of conduit 16, and the seal between rod 38 and end plate 19. This is important because seal leakage causes error in the fluid measurement by the prover. Specifically, shut off valve 14 (FIG. 1) is closed, and the differential pressure across piston 64 is automatically controlled in the manner described in connection with FIG. 3 so as to maintain a small, constant difference in pressure between the upstream side and the downstream side of piston 18 in cylinder 17, the higher pressure being on the downstream side of piston 18. Assuming the valve 14 does not leak, any leakage of fluid through one of the three previously mentioned seals being tested will result in movement of piston 18 and piston 64 by virtue of the automatic control that maintains a constant difference in pressure across piston 18. Leakage in the seal between rod 38 and end plate 19 causes movement of piston 18 upstream; leakage in the other two seals causes movement of piston 18 downstream. A position sensor, which could comprise an electronic reed switch, a battery, and a light emitting diode in series, is placed in a stationary position outside cylinder 60 adjacent to piston 64. If the light emitting diode remains lit over a period of time, piston 64 is stationary and the seals do not leak. However, if the light emitting diode goes off, movement of piston 64 and seal leakage are indicated.

The foregoing seal leakage test could also be performed on a test bench outside an operating fluid system. In the case of a gas system, a different means of sensing movement of piston 18 could be employed, namely, the upstream end of cylinder 17 could be vented to the atmosphere by opening a bleed line and then a soapy solution could be placed over the opening of the bleed line. Leakage of gas through the piston seals from the downstream side of piston 18 would form bubbles in the soapy solution.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, although the invention is particularly useful as a prover, it can also be employed as a calibrator. The invention is equally applicable to gas or liquid systems, and can be applied to any type of flowmeter, although it is particularly designed for determining the characteristic of a turbine type flowmeter that develops electrical ocillations proportional in number to the volume of flow.

What is claimed:

[1. Apparatus for measuring fluid flow comprising: a main conduit through which fluid flows from an upstream position to a downstream position;

a main movable member located within the conduit;

a passage through the main member providing a path for fluid flow from the upstream position to the downstream position;

releaseable means for restraining the main member at the upstream position of the conduit; and means for blocking the passage, the member being adapted to move through the conduit from the upstream position to the downstream position as a fluid barrier in synchronism with fluid flow when the passage is blocked, the improvement characterized in that the restraining means comprises:

an auxiliary conduit fluidically isolated from the main conduit;

an auxiliary movable member located within the auxiliary conduit and adapted to move as a fluid barrier the same distance through the auxiliary conduit as the main member moves through the main conduit;

means for interconnecting the auxiliary member to the main member to move together; and means for fluidically controlling the movement of the auxiliary member through the auxiliary conduit.]

[2. The apparatus of claim 1, in which the interconnecting means comprises a rod extending between the auxiliary member and the main member.]

[3. The apparatus of claim 1, in which the auxiliary member has a first face on one side of the barrier and a second face on the other side of the barrier, and the controlling means comprises:

first means for applying a higher fluid pressure on the first face than the second face to release the main member for movement through the main conduit to the downstream position as a fluid barrier; and second means for applying a higher fluid pressure on the second face than the first face to return the main member to the upstream position of the main conduit.]

[4. The apparatus of claim 3, in which the first applying means comprises means for controlling the movement of the auxiliary member so as to maintain a constant difference in pressure in the main conduit between the main member and the downstream position and between the main member and the upstream position.]

[5. The apparatus of claim 3, in which the first applying means comprises:

a differential pressure transmitter in fluid communication with the upstream position and the downstream position in the main conduit to generate an electrical signal proportional to the pressure difference in the main conduit between the main member and the downstream position and the main member and the upstream position;

a source of fluid under pressure;

a control valve connecting the source to the auxiliary conduit in fluid communication with the first face of the auxiliary member;

a fluid receiver connected to the auxiliary conduit in fluid communication with the second face of the auxiliary member; and means responsive to the electrical signal generated by the differential pressure transmitter for regulating the control valve to maintain a given difference in pressure in the main conduit between the main member and the downstream position and between the main member and the upstream position.]

[6. The apparatus of claim 5, in which the given difference in pressure is a slightly higher pressure in the main conduit between the main member and the downstream position than between the main member and the upstream position.]

[7. The apparatus of claim 1, additionally comprising means for sensing the movement of the auxiliary member through the auxiliary conduit.]

[8. The apparatus of claim 1, in which the blocking means blocks the passage through the main member responsive to the release of the main member by the restraining means.]

[9. The apparatus of claim 8, in which the blocking means comprises a poppet valve in the main conduit upstream of the main member and the interconnecting means comprises a rod extending between the auxiliary member and the poppet valve.]

[10. The apparatus of claim 9, in which the auxiliary member has a first face on one side of the barrier and a second face on the other side of the barrier, and the controlling means comprises:

first means for applying a higher fluid pressure on the first face than the second face to close the poppet valve and release the main member for movement through the main conduit to the downstream position as a fluid barrier, and second means for applying a higher fluid pressure on the second face than the first face to open the poppet valve and return the main member to the upstream position of the main conduit.]

[11. The apparatus of claim 9, in which the rod extends completely through the main conduit from end to end, the main conduit having at both ends seals through which the rod extends outside the main conduit.]

[12. The apparatus of claim 9, additionally comprising:

a further conduit;

a further movable member adapted to travel through the further conduit as a fluid barrier;

a further rod connecting the main member to the further member; and means for controlling the movement of the further member through the further conduit.]

[13. The apparatus of claim 12, in which the means for controlling the movement of the auxilairy member comprises means for applying a differential pressure across the auxiliary member in a sense to open the poppet valve and drive the main member toward the upstream position, and the means for controlling the movement of the further member comprises means for applying a differential pressure across the further member in a sense to open the poppet valve.]

[14. In a fluid system, a flowmeter and a prover permanently connected in line with the fluid flowing through the system, the prover comprising:

a fluid displacement measuring cylinder having at its ends, respectively, an inlet and an outlet connected to the fluid system;

a fluid displacement measuring piston adapted to travel through the measuring cylinder as a fluid barrier;

opening means through the measuring piston to permit fluid flow therethrough from the inlet to the outlet of the measuring cylinder;

a poppet valve on the inlet side of the measuring piston adapted to seal the opening means when closed so the measuring piston travels through the measuring cylinder as a fluid barrier and to permit fluid flow through the opening means when open;

a retracting cylinder having a smaller cross-sectional area than the measuring cylinder;

a retracting piston adapted to travel through the retracting cylinder as a fluid barrier;

a rigid connection between the poppet valve and the retracting piston to open and close the poppet valve as the retracting piston moves relative to the measuring piston; and means for fluidically controlling the movement of the retracting piston through the retracting cylinder.]

[15. The fluid system of claim 14, in which the measuring cylinder and the retracting cylinder are axially aligned with each other, and the rigid connection is a straight rod between the measuring piston and the retracting piston.]

[16. The fluid system of claim 15, in which the flowmeter produces a periodic electrical signal at a rate proportional to the flow rate of the fluid flowing therethrough and the prover includes means for sensing the time required for the measuring piston to travel a given distance through the measuring cylinder, and means responsive to the time sensing means and the electrical signal produced by the flowmeter for generating an indication representative of the flowmeter characteristic.]

[17. The fluid system of claim 15, in which the rod extends completely through the measuring cylinder from end to end, the measuring cylinder having at both ends seals through which the rod extends outside the measuring cylinder.]

[18. The fluid system of claim 15, additionally comprising:

an auxiliary cylinder axially aligned with the measuring cylinder;

an auxiliary piston adapted to travel through the auxiliary cylinder as a fluid barrier;

an auxiliary rod connecting the measuring piston to the auxiliary piston; and means for controlling the movement of the auxiliary piston through the auxiliary cylinder.]

[19. The fluid system of claim 18, in which the means for controlling the movement of the retracting piston comprises means for applying a differential pressure across the retracting piston in a sense to open the poppet valve and drive the measuring piston from the outlet toward the inlet, and the means for controlling the movement of the auxiliary piston comprises means for applying a differential pressure across the auxiliary piston in a sense to open the poppet valve.]

[20. The apparatus of claim 14, in which the controlling means controls the movement of retracting piston so as to maintain a constant difference in pressure in the measuring cylinder between the measuring piston and the outlet and between the measuring piston and the inlet.]

[21. Apparatus for measuring fluid flow comprising a cylinder through which fluid flows from an upstream position to a downstream position; a piston disposed in the cylinder to move therethrough as a fluid barrier in synchronism with fluid flow through the cylinder; and means for sensing the time interval required for the piston to travel a given distance through the cylinder, wherein the improvement comprises:

means for sensing the difference in pressure between the upstream and downstream sides of the piston; and means responsive to the pressure sensing means for controlling the movement of the piston so as to maintain the difference in pressure constant.]

[22. A method of determining the characteristic of a flowmeter in a gas line, the method comprising the steps of:

connecting in series with the flowmeter in the gas line a conduit in which a movable piston is disposed;

opening a passage through the piston to permit unimpeded gas flow through the conduit during normal operation;

closing the passage through the piston when the piston is spaced from the downstream end of the conduit so the piston travels through the conduit toward the downstream end as a gas barrier in synchronism with the gas flowing therethrough;

controlling the movement of the piston through the conduit as a gas barrier to maintain a constant pressure difference between the upstream and downstream sides of the piston; and comparing the response of the flowmeter during a time interval related to the time interval required for the piston to travel a given distance through the conduit as a gas barrier with the volume of the conduit represented by the given distance so as to determine the flowmeter characteristic.]

[23. In apparatus for measuring fluid flow comprising a cylinder through which fluid flows from an upstream end into a downstream end, a piston disposed in the cylinder to move therethrough as a fluid barrier, opening means through the piston to permit fluid flow therethrough from the upstream end to the downstream end of the cylinder, a poppet valve on the upstream side of the piston adapted to seal the opening means when closed so the piston travels through the cylinder as a fluid barrier and to permit fluid flow through the opening means when open, and means for opening and closing the poppet valve, a method for leakage testing the seals of the piston comprising the steps of:

closing the downstream end of the cylinder;

closing the poppet valve;

filling the space between the piston and the downstream end of the cylinder with fluid;

controlling the position of the piston in the cylinder to maintain a constant difference in pressure between the downstream side and the upstream side of the piston, the higher pressure being on the downstream side of the piston; and sensing movement of the piston.]

[24. The method of claim 23, in which the apparatus additionally comprises a retracting cylinder having a smaller cross-sectional area than the first mentioned cylinder and a retracting piston adapted to travel through the retracting cylinder as a fluid barrier; and the opening and closing means comprises a rigid connection between the poppet valve and the retracting piston to open and close the poppet valve as the retracting piston moves relative to the first named piston and means for fluidically controlling the movement of the retracting piston through the retracting cylinder; the controlling step comprising controlling the pressure differential across the retracting piston so as to maintain a constant difference in pressure between the upstream side and the downstream side of the first named piston.]

[25. The method of claim 24, additionally comprising the step of filling the space in the cylinder between the upstream end of the first named cylinder and the first named piston with fluid.]

*26. A method for proving a flowmeter connected in a fluid line, the method comprising the steps of:*

*connecting a measuring cylinder in the fluid line, the measuring cylinder having a piston movable through the cylinder between an upstream position near one end of the cylinder and a downstream position near the other end of the cylinder;*

*connecting a normally open valve in the line to prevent flow past the piston when the valve is closed, thereby driving the piston through the cylinder;*

*setting the piston at the upstream position;*

*closing the valve temporarily to drive the piston to the downstream position in synchronism with fluid flow through the line;*

*opening the valve when the piston reaches the downstream position; and*

*maintaining the pressure difference across the piston constant during its movement from the upstream position to the downstream position so as to suppress perturbations in the fluid line.*

*27. The method of claim 26, in which the measuring piston is connected by a rod to another piston movable through another cylinder and the maintaining step comprises measuring the pressure difference across the measuring piston and adjusting the pressure difference across the other piston to offset changes in the pressure difference across the measuring piston.*

*28. The method of claim 26, additionally comprising the steps of sensing the time interval required for the piston to pass between two points along the measuring cylinder during its movement from the upstream position to the downstream position; and*

*comparing the sensed time interval with the response of the flowmeter during such time interval.*

*29. Apparatus for measuring fluid flow comprising:*

*a main conduit through which fluid flows from an inlet to an outlet;*

*a main movable member located within the conduit;*

*a normally open passage for fluid flow from the inlet to the outlet;*

*releasable means for restraining the main member at an upstream position of the conduit; and*

*means for closing the passage, the member being adapted to move through the conduit from the upstream position to a downstream position as a fluid barrier in synchronism with fluid flow when the passage is closed, the improvement characterized in that the restraining means comprises:*

*an auxiliary conduit fluidically isolated from the main conduit;*

*an auxiliary movable member located within the auxiliary conduit and adapted to move as a fluid barrier through the auxiliary conduit;*

*means for interconnecting the auxiliary member to the main member to move together; and*

*means for fluidically controlling the movement of the auxiliary member through the auxiliary conduit.*

*30. A method for proving a flowmeter connected in a fluid line, the method comprising the steps of:*

*connecting a measuring cylinder in the fluid line, the measuring cylinder having a piston movable through the cylinder as a fluid barrier between an upstream position near one end of the cylinder and a downstream position near the other end of the cylinder;*

*forming passage means for flow of fluid in the line from one side of the piston to the other;*

*setting the piston at the upstream position;*

*closing the passage means temporarily to drive the piston as a fluid barrier to the downstream position in synchronism with fluid flow through the line;*

*opening the passage means when the piston reaches the downstream position; and*

*maintaining the pressure difference across the piston constant during its movement from the upstream position to the downstream position so as to suppress perturbations in the fluid line.*

*31. Apparatus for measuring fluid flow comprising:*

*a measuring cylinder having an inlet and an outlet;*

*a fluid displacement measuring piston adapted to travel through the measuring cylinder as a fluid barrier;*

*another cylinder;*

*another piston adapted to travel through the other cylinder as a fluid barrier;*

*means for coupling the measuring piston and the control piston to transmit to the measuring piston forces exerted on the other piston;*

*means for applying to the other cylinder fluid to create across the other piston a pressure difference that holds the measuring piston in a stationary position near the inlet of the conduit; and*

*means for eliminating the piston holding pressure difference to release the measuring piston from the stationary position for movement through the measuring cylinder in synchronism with fluid flowing through the system.*

*32. The apparatus of claim 31, additionally comprising passage means for fluid flow between the inlet and the outlet from one side of the measuring piston to the other, the passage means closing upon release of the measuring piston from the stationary position for movement through the measuring cylinder.*

*33. In a fluid system having a fluid line through which a fluid flows and a flowmeter in the line, a prover connected in series with the flowmeter so the fluid flows through both the prover and the flowmeter, the prover comprising:*

*a fluid displacement measuring cylinder having an inlet and an outlet connected to the fluid line;*

*a fluid displacement measuring piston adapted to travel through the measuring cylinder as a fluid barrier;*

*another cylinder;*

*another piston adapted to travel through the other cylinder as a fluid barrier;*

*means for coupling the measuring piston and the other piston to drive the measuring piston responsive to the movement of the other piston;*

*means for applying fluid to the other cylinder to control the movement of the other piston and thereby the movement of the measuring piston;*

*a normally open valve in the line preventing fluid flow past the measuring piston when the valve is closed; and*

*means for closing the valve to temporarily prevent passage of fluid from one side of the measuring piston to the other.*

*34. Apparatus for measuring fluid flow comprising:*

*a main conduit defining a flow passage from an inlet to an outlet and including a measuring cylinder;*

*a closable opening disposed in the conduit between its inlet and outlet;*

*a main piston movable through the measuring cylinder;*

*an auxiliary conduit fluidically isolated from the main conduit;*

*an auxiliary piston movable through the auxiliary conduit;*

*means for varying the pressure applied to the auxiliary piston; and*

*means connected at one end to the auxiliary piston and at its other end operatively adapted to the main piston to close the closable opening responsive to reduction of pressure on the auxiliary piston,*

*the closure of the closable opening acting to cause movement of the main piston within the measuring cylinder.*

*35. Apparatus for measuring fluid flow comprising:*

*a conduit having an inlet and an outlet and including a measuring cylinder between the inlet and the outlet;*

*a measuring piston movable through the measuring cylinder as a fluid barrier between an upstream position and a downstream position, the measuring piston having a downstream side between the piston and the downstream position and an upstream side between the piston and the upstream position such that fluid flowing through the conduit from inlet to outlet exerts a force on the upstream side of the piston urging it toward the downstream position;*

*opening means permitting flow through the conduit from the upstream side of the piston to the downstream side of the piston when the piston is at its upstream position, the opening means being adapted to close as the measuring piston leaves its upstream position moving toward its downstream position;*

*an auxiliary cylinder fluidically isolated from the measuring cylinder;*

*an auxiliary piston movable through the auxiliary cylinder;*

*means for interconnecting the auxiliary piston to the measuring piston to transmit to the measuring piston forces exerted on the auxiliary piston;*

*means for normally supplying to the auxiliary cylinder fluid to create a pressure difference across the auxiliary piston that holds the measuring piston at its upstream position; and*

*means for eliminating the piston holding pressure difference to release the measuring piston, thereby permitting the measuring piston to move through the measuring cylinder toward its downstream position in response to the force of flowing fluid on the upstream side of the measuring piston, the opening means closing as the piston moves away from its upstream position, thereby driving the measuring piston toward its downstream position in synchronism with fluid flow through the measuring cylinder.*

*36. A method for measuring flow through a fluid line by means of a conduit defining from an inlet to an outlet a flow passage including a measuring cylinder, a measuring piston movable through the measuring cylinder as a fluid barrier between an upstream position and a downstream position, an auxiliary cylinder fluidically isolated from the measuring cylinder, an auxiliary piston movable through the auxiliary cylinder as a fluid barrier, passage means for flow of fluid in the line from the upstream side of the measuring piston to the downstream side of the measuring piston, and means for interconnecting the auxiliary piston to the measuring piston to transmit to the measuring piston forces exerted on the auxiliary piston, the method comprising the steps of:*

*connecting the conduit in the fluid line;*

*placing the measuring piston at its upstream position;*

*closing the passage means to drive the measuring piston through the measuring cylinder to its downstream position as a fluid barrier in synchronism with fluid flow through the line;*

*opening the passage means when the measuring piston reaches its downstream position;*

*supplying to the auxiliary cylinder fluid to create across the auxiliary piston a pressure difference that returns the measuring piston from its downstream position to its upstream position; and*

*maintaining fluid flow through the conduit from one side of the measuring piston to the other as the measuring piston is returned from its downstream position to its upstream position.*

*37. The method of claim 36, additionally comprising the step of supplying to the auxiliary cylinder, while the measuring piston is at its upstream position with the passage means open, fluid to create across the auxiliary piston a pressure difference that holds the measuring piston in its upstream position.*

*38. The method of claim 37, additionally comprising the steps of:*

*temporarily eliminating the piston holding pressure difference across the auxiliary piston to release the measuring piston, while the measuring piston is at its upstream position, the passage means closing upon elimination of the piston holding pressure difference, thereby permitting the measuring piston to move through the measuring cylinder toward its downstream position as a fluid barrier.*

*39. The method of claim 38, additionally comprising the step of measuring the time interval during downstream travel of the measuring piston through a portion of the measuring cylinder as a fluid barrier.*

*40. The method of claim 36, additionally comprising the step of measuring the time interval during downstream travel of the measuring piston through a portion of the measuring cylinder as a fluid barrier.*

*41. Apparatus for measuring fluid flow comprising:*

*a main conduit through which fluid flows from an upstream position to a downstream position;*

*a main movable member located within the conduit;*

*a passage through the main member providing a path for fluid flow from the upstream position to the downstream position;*

*releasable means for restraining the main member at the upstream position of the conduit; and*

*means for blocking the passage, the member being adapted to move through the conduit from the upstream position to the downstream position as a fluid barrier in synchronism with fluid flow when the passage is blocked, the improvement characterized in that the restraining means comprises:*

*an auxiliary conduit fluidically isolated from the main conduit;*

*an auxiliary movable member located within the auxiliary conduit and adapted to move as a fluid barrier the same distance through the auxiliary conduit as the main member moves through the main conduit;*

*means for interconnecting the auxiliary member to the main member to move together; and*

*means for fluidically controlling the movement of the auxiliary member through the auxiliary conduit.*

*42. The apparatus of claim 41, in which the interconnecting means comprises a rod extending between the auxiliary member and the main member.*

*43. The apparatus of claim 41 in which the auxiliary member has a first face on one side of the barrier and a second face on the other side of the barrier, and the controlling means comprises:*

*first means for applying a higher fluid pressure on the first face than the second face to release the main member for movement through the main conduit to the downstream position as a fluid barrier; and*

*second means for applying a higher fluid pressure on the second face than the first face to return the main member to the upstream position of the main conduit.*

*44. The apparatus of claim 43, in which the first applying means comprises means for controlling the movement of the auxiliary member so as to maintain a constant difference in pressure in the main conduit between the main member and the downstream position and between the main member and the upstream position.*

*45. The apparatus of claim 43, in which the first applying means comprises:*

*a differential pressure transmitter in fluid communication with the upstream position and the downstream position in the main conduit to generate an electrical signal proportional to the pressure difference in the main conduit between the main member and the downstream position and the main member and the upstream position;*

*a source of fluid under pressure;*

*a control valve connecting the source to the auxiliary conduit in fluid communication with the first face of the auxiliary member;*

*a fluid receiver connected to the auxiliary conduit in fluid communication with the second face of the auxiliary member; and*

*means responsive to the electrical signal generated by the differential pressure transmitter for regulating the control valve to maintain a given difference in pressure in the main conduit between the main member and the downstream position and between the main member and the upstream position.*

*46. The apparatus of claim 45, in which the given difference in pressure is a slightly higher pressure in the main conduit between the main member and the downstream position than between the main member and the upstream position.*

*47. The apparatus of claim 41, additionally comprising means for sensing the movement of the auxiliary member through the auxiliary conduit.*

*48. The apparatus of claim 41, in which the blocking means blocks the passage through the main member responsive to the release of the main member by the restraining means.*

*49. The apparatus of claim 48, in which the blocking means comprises a poppet valve in the main conduit upstream of the main member and the interconnecting means comprises a rod extending between the auxiliary member and the poppet valve.*

*50. The apparatus of claim 49, in which the auxiliary member has a first face on one side of the barrier and a second face on the other side of the barrier, and the controlling means comprises:*

*first means for applying a higher fluid pressure on the first face than the second face to close the poppet valve and release the main member for movement through the main conduit to the downstream position as a fluid barrier; and*

*second means for applying a higher fluid pressure on the second face than the first face to open the poppet valve and return the main member to the upstream position of the main conduit.*

*51. The apparatus of claim 49, in which the rod extends completely through the main conduit from end to end, the main conduit having at both ends seals through which the rod extends outside the main conduit.*

*52. The apparatus of claim 49, additionally comprising:*

*a further conduit;*

*a further movable member adapted to travel through the further conduit as a fluid barrier;*

*a further rod connecting the main member to the further member; and*

*means for controlling the movement of the further member through the further conduit.*

*53. The apparatus of claim 52, in which the means for controlling the movement of the auxiliary member comprises means for applying a differential pressure across the auxiliary member in a sense to open the poppet valve and drive the main member toward the upstream position, and the means for controlling the movement of the further member comprises means for applying a differential pressure across the further member in a sense to open the poppet valve.*

*54. In a fluid system, a flowmeter and a prover permanently connected in line with the fluid flowing through the system, the prover comprising:*

*a fluid displacement measuring cylinder having at its ends, respectively, an inlet and an outlet connected to the fluid system;*

*a fluid displacement measuring piston adapted to travel through the measuring cylinder as a fluid barrier;*

*opening means through the measuring piston to permit fluid flow therethrough from the inlet to the outlet of the measuring cylinder;*

*a poppet valve on the inlet side of the measuring piston adapted to seal the opening means when closed so the measuring piston travels through the measuring cylinder as a fluid barrier and to permit fluid flow through the opening means when open;*

*a retracting cylinder having a smaller cross-sectional area than the measuring cylinder;*

*a retracting piston adapted to travel through the retracting cylinder as a fluid barrier;*

*a rigid connection between the poppet valve and the retracting piston to open and close the poppet valve as the retracting piston moves relative to the measuring piston; and*

*means for fluidically controlling the movement of the retracting piston through the retracting cylinder.*

*55. The fluid system of claim 54, in which the measuring cylinder and the retracting cylinder are axially aligned with each other, and the rigid connection is a straight rod between the measuring piston and the retracting piston.*

*56. The fluid system of claim 55, in which the flowmeter produces a periodic electrical signal at a rate proportional*

*to the flow rate of the fluid flowing therethrough, and the prover includes means for sensing the time required for the measuring piston to travel a given distance through the measuring cylinder, and means responsive to the time sensing means and the electrical signal produced by the flowmeter for generating an indication representative of the flowmeter characteristic.*

*57. The fluid system of claim 55, in which the rod extends completely through the measuring cylinder from end to end, the measuring cylinder having at both ends seals through which the rod extends outside the measuring cylinder.*

*58. The fluid system of claim 55, additionally comprising:*

*an auxilairy cylinder axially aligned with the measuring cylinder;*

*an auxilairy piston adapted to travel through the auxiliary cylinder as a fluid barrier;*

*an auxiliary rod connecting the measuring piston to the auxiliary piston; and*

*means for controlling the movement of the auxiliary piston through the auxiliary cylinder.*

*59. The fluid system of claim 58, in which the means for controlling the movement of the retracting piston comprises means for applying a differential pressure across the retracting piston in a sense to open the poppet valve and drive the measuring piston from the outlet toward the inlet, and the means for controlling the movement of the auxiliary piston comprises means for applying a differential pressure across the auxiliary piston in a sense to open the poppet valve.*

*60. The apparatus of claim 54, in which the controlling means controls the movement of retracting piston so as to maintain a constant difference in pressure in the measuring cylinder between the measuring piston and the outlet and between the measuring piston and the inlet.*

*61. A method of determining the characteristic of a flowmeter in a gas line, the method comprising the steps of:*

*connecting in series with the flowmeter in the gas line a conduit in which the movable piston is disposed;*

*opening a passage through the piston to permit unimpeded gas flow through the conduit during normal operation;*

*closing the passage through the piston when the piston is spaced from the downstream end of the conduit so the piston travels through the conduit toward the downstream end as a gas barrier in synchronism with the gas flowing therethrough;*

*controlling the movement of the piston through the conduit as a gas barrier to maintain a constant pressure difference between the upstream and downstream sides of the piston; and*

*comparing the response of the flowmeter during a time interval related to the time interval required for the piston to travel a given distance through the conduit as a gas barrier with the volume of the conduit represented by the given distance so as to determine the flowmeter characteristic.*

*62. In apparatus for measuring fluid flow comprising a cylinder through which fluid flows from an upstream end into a downstream end, a piston disposed in the cylinder to move therethrough as a fluid barrier, opening means through the piston to permit fluid flow therethrough from the upstream end to the downstream end of the cylinder, a poppet valve on the upstream side of the piston adapted to seal the opening means when closed so the piston travels through the cylinder as a fluid barrier and to permit fluid flow through the opening means when open, and means for opening and closing the poppet valve, a method for leakage testing the seals of the piston comprising the steps of:*

*closing the downstream end of the cylinder;*

*closing the poppet valve;*

*filling the space between the piston and the downstream end of the cylinder with fluid;*

*controlling the position of the piston in the cylinder to maintain a constant difference in pressure between the downstream side and the upstream side of the piston, the higher pressure being on the downstream side of the piston; and*

*sensing movement of the piston.*

*63. The method of claim 62, in which the apparatus additionally comprises a retracting cylinder having a smaller cross-sectional area than the first mentioned cylinder and a retracting piston adapted to travel through the retracting cylinder as a fluid barrier; and the opening and closing means comprises a rigid connection between the poppet valve and the retracting piston to open and close the poppet valve as the retracting piston moves relative to the first named piston and means for fluidically controlling the movement of the retracting piston through the retracting cylinder; the controlling step comprising controlling the pressure differential across the retracting piston so as to maintain a constant difference in pressure between the upstream side and the downstream side of the first named piston.*

*64. The method of claim 63, additionally comprising the step of filling the space in the cylinder between the upstream end of the first named cylinder and the first named piston with fluid.*

*65. In a fluid system having a fluid line through which a fluid flows and a flowmeter in the line, a prover connected in series with the flowmeter so the fluid flows through both the prover and the flowmeter, the prover comprising:*

*a fluid displacement measuring cylinder having an inlet and an outlet connected to the fluid line;*

*a fluid displacement measuring piston adapted to travel through the measuring cylinder as a fluid barrier;*

*another cylinder;*

*another piston adapted to travel through the other cylinder as a fluid barrier;*

*means for coupling the measuring piston and the other piston to drive the measuring piston responsive to movement of the other piston;*

*means for applying fluid to the other cylinder to control the movement of the other piston and thereby the movement of the measuring piston; and*

*means for preventing passage of fluid through the fluid line to drive the measuring piston through the cylinder in synchronism with fluid flowing through the system.*

*66. The prover of claim 65, in which the measuring cylinder has at its ends, respectively, an inlet and an outlet and the pistons each have an upstream side and a downstream side, the applying means including means for pressurizing the downstream side of the other piston relative to the upstream side thereof to retract the measuring piston to the inlet and/or maintain the measuring piston at the inlet.*

*67. The prover of claim 66, in which the applying means additionally includes means for pressurizing the upstream side of the other piston relative to the downstream side thereof to release the measuring piston for movement toward the outlet as a fluid barrier in synchronism with fluid flow.*

*68. The prover of claim 67, in which the applying means additionally comprises means for varying the pressurization of the one side of the other piston relative to the other side thereof to maintain a constant pressure difference between the upstream side and the downstream side of the measuring piston.*

*69. The prover of claim 68, in which the means for varying the pressurization maintains a slightly higher pressure on the downstream side of the measuring piston than on the upstream side thereof.*

*70. The prover of claim 65, in which the measuring cylinder and the other cylinder are axially aligned with each other and the rigid connection is a straight rod between the measuring piston and the other piston.*

*71. The prover of claim 70, in which the rod extends completely through the measuring cylinder from end-to-end, the measuring cylinder having at both ends seals through which the rod extends outside the measuring cylinder.*

*72. The prover of claim 65, additionally comprising means for sensing the displacement of the other piston through the other cylinder.*

*73. The prover of claim 72, in which the displacement sensing means comprises magnetic pickoffs mounted on the other cylinder at spaced apart points along the path of travel of the other piston.*

*74. Apparatus for measuring fluid flow comprising:*

*a measuring cylinder having an inlet and an outlet;*

*a fluid displacement measuring piston adapted to travel through the measuring cylinder as a fluid barrier;*

*another cylinder;*

*another piston adapted to travel through the other cylinder as a fluid barrier;*

*means for coupling the measuring piston and the other piston to transmit to the measuring piston forces exerted on the other piston;*

*means for applying to the other cylinder fluid to create across the control piston a pressure difference that holds the measuring piston in a stationary position near the inlet of the conduit;*

*means for eliminating the piston holding pressure difference to release the measuring piston from the stationary position for movement through the measuring cylinder in synchronism with fluid flowing through the system; and*

*bypass means for fluid flow between the inlet and the outlet from one side of the measuring piston to the other, the passage means closing responsive to the eliminating means when the piston holding pressure is eliminated.*

*75. The method of claim 35, in which the maintaining step maintains the pressure downstream of the piston slightly larger than the pressure upstream of the piston.*

*76. The method of claim 40, in which the maintaining step maintains the pressure downsteam of the piston larger than the pressure upstream thereof.*

* * * * *

UNITED STATES PATENT AND TRADEMARK OFFICE

CERTIFICATE OF CORRECTION

PATENT NO. : RE 31,432

DATED : November 1, 1983

INVENTOR(S) : Edward E. Francisco, Jr.

It is certified that error appears in the above-identified patent and that said Letters Patent is hereby corrected as shown below:

Column 12, line 35, "control" should be --other--.

Column 17, line 15, "auxilairy" should be --auxiliary--;
line 17, "auxilairy" should be --auxiliary--;
line 40, "the" should be --a--.

Column 18, line 67, --is-- should be inserted between "barrier" and "in".

Column 20, line 18, "bypass" should be --passage--;
line 26, "40" should be --30--.

Signed and Sealed this

*Thirteenth* Day of *November 1984*

[SEAL]

*Attest:*

*Attesting Officer*

GERALD J. MOSSINGHOFF

*Commissioner of Patents and Trademarks*